United States Patent Office 3,333,089
Patented July 25, 1967

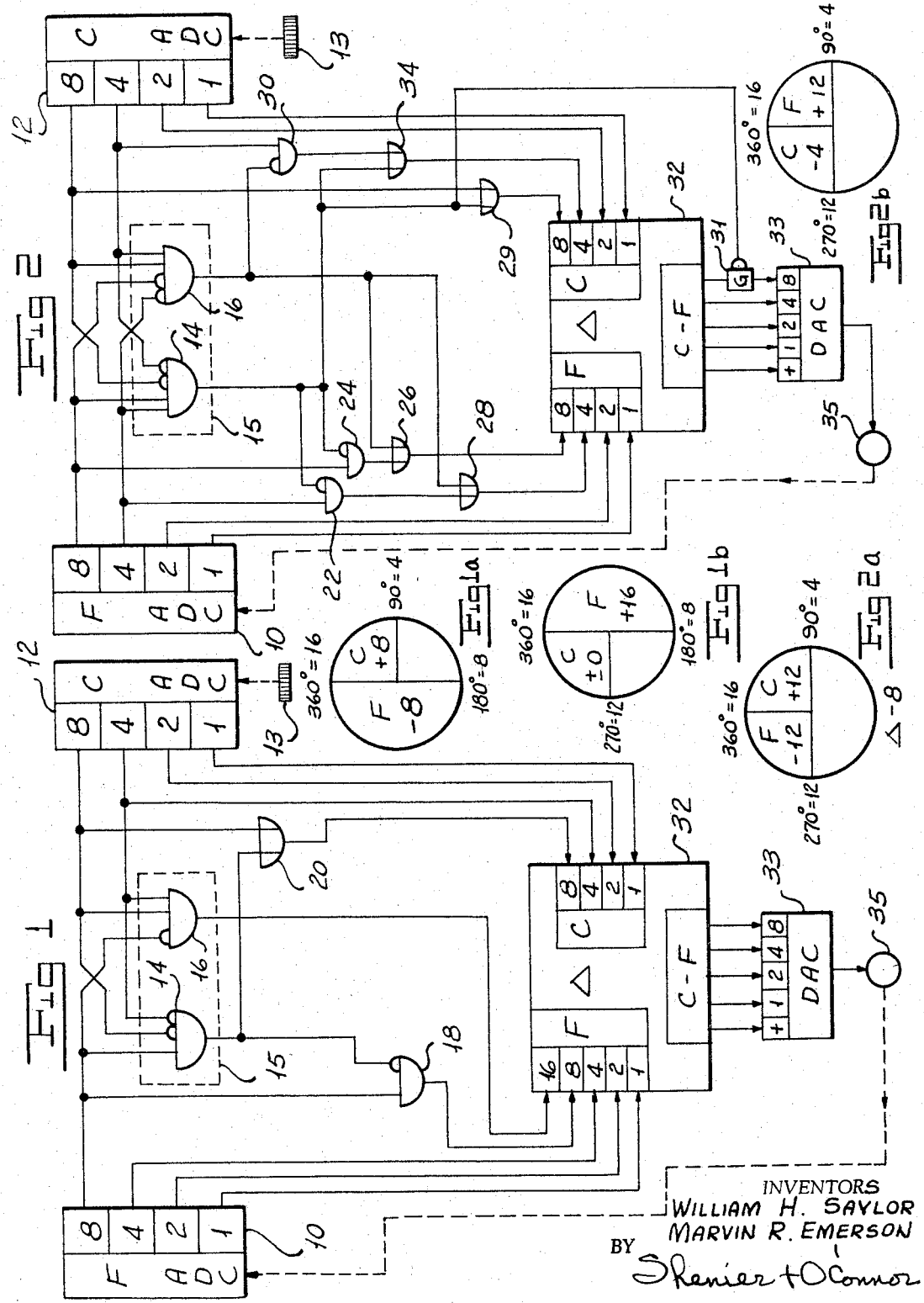

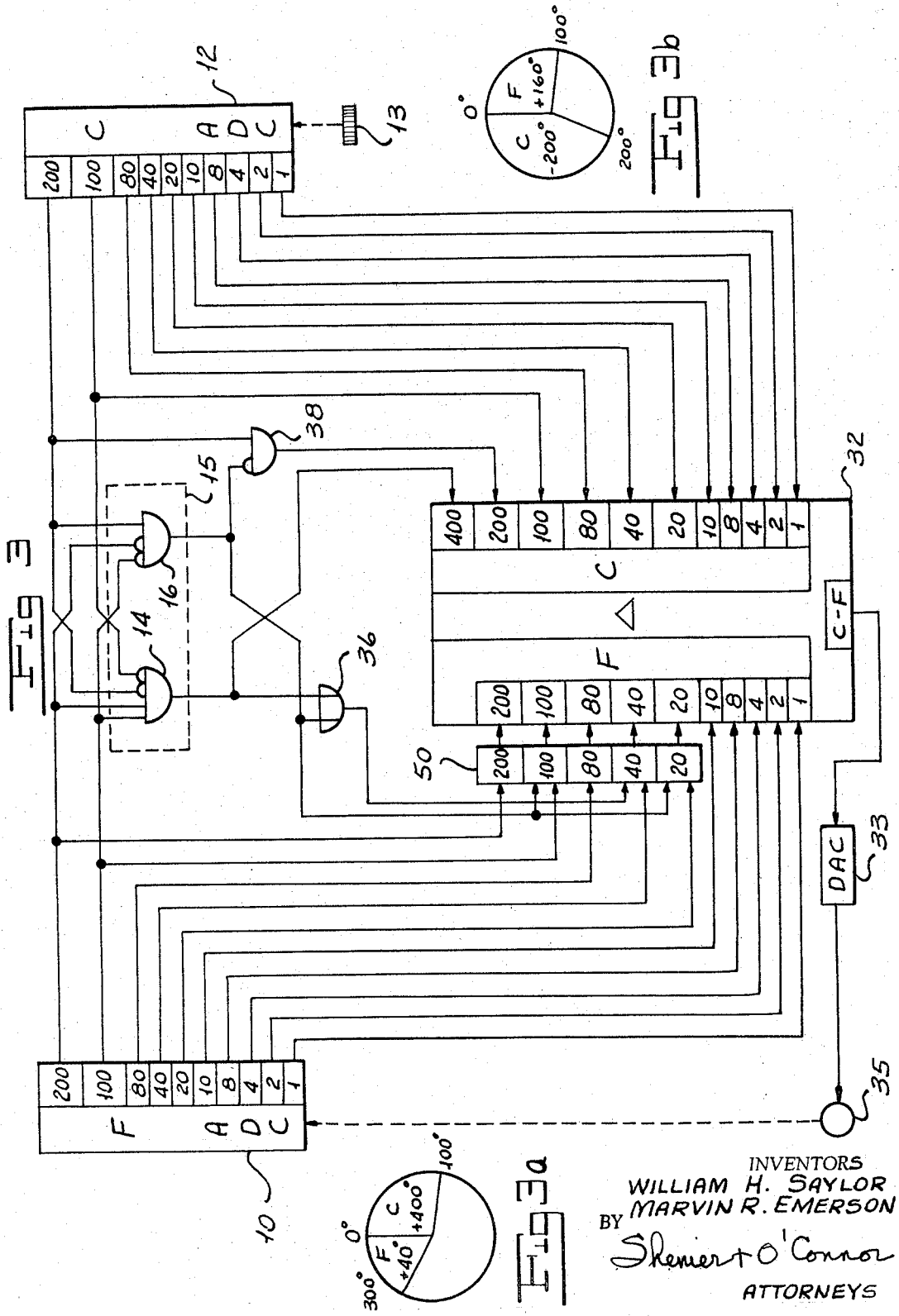

1

3,333,089
THROUGH-ZERO COMPARATOR
William H. Saylor, Corona Del Mar, and Marvin R. Emerson, Tustin, Calif., assignors, by mesne assignments, to Coleman Engineering Company, Inc., Los Angeles, Calif., a corporation of California
Filed Sept. 30, 1963, Ser. No. 312,679
11 Claims. (Cl. 235—151.11)

Our invention relates to through-zero comparators and more particularly to comparators for digital positioning systems which produce proportional error-signals about the zero position.

In digital positioning systems the numerical representations of shaft position extend from a count of zero to some maximum count. The maximum count and the count of zero are, however, adjacent representations even though of greatly differing numerical values. Accordingly, adjacent the zero position a discontinuity is present in the numerical indications of shaft position. Digital positioning systems of the prior art control the direction of rotation by determining whether the difference between the actual shaft position and the desired shaft position is greater than or less than one-half the maximum count. Such systems provide only for the polarity of the error and not for its magnitude. The rapid and accurate positioning of a shaft requires a proportional system which indicates the magnitude of the error in order to prevent overshoot, oscillation, and other instability.

One object of our invention is to provide a through-zero comparator which indicates the proper polarity to reposition a shaft through the shorter path.

A further object of our invention is to provide a through-zero comparator which indicates the numerical magnitude of the error in shaft position even though the repositioning of the shaft may be through the zero position.

Other and further objects of our invention will appear from the following description.

In general our invention contemplates the provision of a digital command signal which is compared with a digital feedback signal provided by a shaft-position analog-to-digital converter. The comparison of the two signals is accomplished by conventional digital comparator or subtraction circuits which provides a digital output representation proportional to the difference between the two signals. The digital error signal is converted to a corresponding analog voltage which proportionally drives a servomotor coupled to the feedback analog-to-digital converter. As thus far described the system is entirely conventional. The problems which arise in digital positioning systems all flow from the discontinuity in the numerical output representation of the feedback transducer adjacent the zero position. We prevent this discontinuity from being presented to the comparator by modifying either or both of the comparator inputs by auxiliary digital indications the algebraic differences of which is one greater than the maximum count of the feedback transducer and hence represents one revolution or 360°. We divide 360° of shaft rotation into three sectors. A first sector extends from 0° through preferably one-third of a revolution to 120°; a second sector extends from 359° through preferably one-third of a revolution to 240°; a third sector also extends preferably through one-third of a revolution from 120° to 240°. If the digital command indication of desired position is within one of the first and second sectors and if the digital feedback representation of actual position is within the other of the first and second sectors, then we assume that a through-zero solution is required and modify the comparator inputs by quantities the algebraic difference of

2 which is equal to the maximum count of the feedback converter plus unity.

In the accompanying drawings which form part of the instant specification and which are to be read in conjunction therewith and in which like reference numerals are used to indicate like parts in the various views:

FIGURE 1 is a schematic view of one form of our invention using a pure binary code converter having a maximum count of 15.

FIGURES 1a and 1b show the two sectors adjacent the zero position and the corresponding modification of command and feedback digital indications within the sectors for the circuit of FIGURE 1.

FIGURE 2 is a schematic view of a second form of our invention, again using a pure binary code converter having a maximum count of 15.

FIGURES 2a and 2b show the two sectors adjacent the zero position and the corresponding modification of the comparator inputs for the circuit of FIGURE 2.

FIGURE 3 is a schematic view of a third form of our invention employing a binary-coded decimal converter having a maximum count of 359.

FIGURES 3a and 3b show the two sectors adjacent the zero position and the corresponding modification of the comparator inputs for the circuit of FIGURE 3.

Referring now more particularly to FIGURE 1 of the drawings, a command analog-to-digital converter 12 has a maximum count of 15 and provides the outputs "1," "2," "4" and "8." Converter 12 is a shaft-position encoder and may be actuated manually by knob 13. A corresponding feedback shaft-position analog-to-digital converter 10 may be identical to converter 12. The "8" and "4" outputs of converter 12 are coupled to first and second inhibiting inputs of AND circuit 14 and to first and second inputs of AND circuit 16. The "8" output of converter 10 is coupled to a third inhibiting input of AND circuit 16 and to a third input of AND circuit 14. The AND circuits 14 and 16 comprise a through-zero detector 15. The output of AND circuit 14 is coupled to one input of an OR circuit 20 and to an inhibiting input of AND circuit 18. The "8" output of converter 10 is coupled to the other input of AND circuit 18. The "8" output of converter 12 is coupled to a second input of OR circuit 20. A comparator or subtraction circuit 32 provides a digital output indication C—F which is equal to the difference between the feedback digital indication F and the command digital indication C. The "1," "2," and "4" outputs of converter 12 are coupled to the corresponding "1," "2," and "4" command inputs of comparator 32. The output of OR circuit 20 is coupled to the "8" command input of comparator 32. The "1," "2," and "4" outputs of converter 10 are coupled to the corresponding "1," "2," and "4" feedback inputs of comparator 32. The output of AND circuit 18 is coupled to the "8" feedback input of comparator 32. The output of AND circuit 16 is coupled to a "16" feedback input of comparator 32. The C—F output of comparator 32 comprises five bits one of which is indicative of polarity. The "+," "1," "2," "4," and "8" outputs of comparator 32 are coupled to corresponding inputs of a digital-to-analog converter 33 which converts the digital indication of the error into a corresponding analog voltage. The output voltage of converter 33 is impressed on servomotor 35 which drives the feedback analog-to-digital converter 10.

In operation of the circuit of FIGURE 1, the maximum count of converters 10 and 12 is 15. Accordingly, a count of 15 plus unity or 16 represents one full revolution or 360°, while a count of 4 represents 90°, a count of 8 represents 180°, and a count of 12 represents 270°. Referring now to FIGURE 1a, if the command representation is between 0° and 90° (0 to 3) and the feedback representation is between 180° and 360° (8 to 15) then the command indication is augmented by 8 while the feedback indication is diminished by 8. This changes the normal comparator output C—F by 8—(—8)=16, which represents one revolution or 360°. The AND circuit 14 provides an output when the command and feedback transducers 12 and 10 are within the sectors indicated in FIGURE 1a. When the output of command converter 12 lies between 0 and 3 then no "8" or "4" outputs are produced; and the absence thereof partially enables AND circuit 14. When the feedback indication provided by converter 10 is between 8 and 15 then it provides an "8" output, causing AND circuit 14 likewise to provide an output. This output of AND circuit 14 is coupled through OR circuit 20, augmenting the command input to comparator 32 by 8. The presence of an output from AND circuit 14 prevents AND circuit 18 from coupling the "8" output of converter 10 to the "8" feedback input of comparator 32. This diminishes the actual feedback input to the comparator by 8. For example, assume that the command representation is 0 and the feedback representation is 15. As previously indicated, AND circuit 14 provides a through-zero output. Thus the actual command input to comparator 32 is C+8=0+8=8; and the actual feedback input to comparator 32 is 15—8=7. The comparator properly indicates that the difference C—F=8—7=1. The corresponding voltage output from converter 33 to servomotor 35 drives feedback converter 10, changing the feedback representation from 15 to 0.

In operation of the circuit of FIGURE 1 and referring now to FIGURE 1b, if the feedback representation lies between 0° and 180° (0 to 7) and the command representation lies between 270° and 360° (12 to 15) then the feedback representation is augmented by 16. This changes the normal comparator output C—F by 0—16=—16, which represents one revolution or 360°. The AND circuit 16 provides an output when the command and feedback representations lie within the sectors indicated in FIGURE 1b. When the command representation is between 12 and 15 then both an "8" and a "4" output are provided by converter 12, partially enabling AND circuit 16. When the feedback representation is between 0 and 7, no "8" output is provided by converter 10. Thus AND circuit 16 provides an output, augmenting the feedback input of comparator 32 by 16. Assume that the command representation is 15 and that the feedback representation is 0. Since the command and feedback indications are within the first and second sectors bounding the zero point, AND circuit 16 provides a through-zero output, causing the actual feedback input to comparator 32 to be F+16=0+16=16. Comparator 32 properly provides the output C—F=15—16=—1. The output from comparator 32 to converter 33 causes servomotor 35 to drive converter 10, changing the feedback representation from 0 to 15.

Our through-zero comparator does not always yield the shorter path to coincidence. For example, if in FIGURE 1a the command indication is 3 and the feedback indication is 8 then a through-zero output from AND circuit 14 will be produced. The shorter path C—F=3—8=—5 is ignored. The actual path is (C+8)—(F—8)=11—0=11. Thus compaartor 32 and converter 33 must accommodate differences up to and including 11 even though this represents more than half a revolution. Also if in FIGURE 1b the command representation is 12 and the feedback representation is 7 then a through-zero output from AND circuit 16 will be produced. The shorter path C—F=12—7=+5 is ignored. The actual path is C+0)—(F+16)=12—23=—11.

Referring now to FIGURE 2, the "8" and "4" outputs of feedback converter 10 are coupled to a first and second input of AND circuit 14 and to a first and second inhibiting input of AND circuit 16. The "8" and "4" outputs of command converter 12 are coupled to a third and fourth input of AND circuit 16 and to a third and fourth inhibiting input of AND circuit 14. Again the "1" and "2" outputs of feedback and command converters 10 and 12 are coupled to corresponding "1" and "2" feedback and command inputs of comparator 32. The "8" output of converter 12 is coupled to one input of an OR circuit 29. The output of AND circuit 14 is coupled to inhibiting inputs of AND circuits 22 and 24, to one input of an OR circuit 34, and to the other input of OR circuit 29. The output of AND circuit 16 is coupled to an inhibiting input of AND circuit 30 and to one input of each of OR circuits 26 and 28. The "4" and "8" outputs of converter 10 are coupled respectively to the other input of each of AND circuits 22 and 24. The "4" output of command converter 12 is coupled to the other input of AND circuit 30, the output of which is connected to a second input of OR circuit 34. The output of OR circuit 34 is connected to the "4" command input of comparator 32; and the output of OR circuit 29 is connected to the "8" command input of comparator 32. The output of AND circuit 24 is coupled to a second input of OR circuit 26, the output of which is connected to the "8" feedback input of comparator 32. The output of AND circuit 22 is connected to a second input of OR circuit 28, the output of which is coupled to the "4" feedback input of comparator 32. The "8" output of comparator 32 is coupled through a gate 31 to the "8" input of converter 33. The output of AND circuit 14 is connected to an inhibiting input of gate 31.

In operation of the circuit of FIGURE 2 and referring now to FIGURE 2a, if the command indication is between 0° and 90° (0 to 3) and the feedback indication is between 270° and 360° (12 to 15) then the command indication is augmented by 12 and the feedback indication is diminished by 12. This changes the normal comparator output C-F by 12—(—12)=24, which represents more than one revolution. However the comparator output is diminished by 8. Thus C—F—8=24—8=16 which does represent one revolution or 360°. The AND circuit 14 provides an output when the command and feedback representations are within the sectors indicated in FIGURE 2a. When the command representation lies between 0 and 3 then no "8" or "4" output is provided from converter 12, thereby partially enabling AND circuit 14. When the feedback representation is between 12 and 15 then both an "8" and a "4" output are provided from feedback converter 10, causing AND circuit 14 to provide an output. This output is coupled through OR circuits 29 and 34 to the "8" and "4" command inputs of comparator 32, augmenting such command input by 12. The presence of an output from circuit 12 prevents AND circuits 22 and 24 from coupling the "8" and "4" outputs of converter 10 to the corresponding "8" and "4" feedback inputs of comparator 32, diminishing such feedback input by 12. The output of AND circuit 14 also prevents the "8" output of comparator 32 from being coupled to the "8" input of converter 33, thus diminishing the difference C-F by 8. For example, assume that the command representation is 0 and the feedback representation is 15. Since these representations are within the sectors indicated in FIGURE 2a, AND circuit 14 provides a through-zero output. The actual quantities impressed upon comparator 32 are $$C+12=0+12=12$$

and F—12=15—12=3. Thus comparator 32 provides an output C—F=12—3=9. However the input to converter 33 is (C—F)—8=9—8=1. The corresponding output voltage from converter 33 to servomotor 35 drives the feedback analog-to-digital converter 10, changing the feedback representation from 15 to 0.

In operation of the circuit of FIGURE 2 and referring now to FIGURE 2b, if the command indication is between 270° and 360° (12 to 15) and the feedback indication is between 0° and 90° (0 to 3) then the feedback indication coupled to comparator 32 is augmented by 12 while the command representation coupled to comparator 32 is diminished by 4. This changes the normal comparator output C−F by −4−12=−16. The AND circuit 16 provides an output when the command and feedback representations are within the sectors indicated in FIGURE 2b. When the command representation lies between 12 and 15 then both an "8" and a "4" output are provided from command converter 12, partially enabling AND circuit 16. With a feedback representation between 0 and 3 the absence of "8" and "4" outputs from converter 10 causes AND circuit 16 to provide an output. This output is coupled through OR circuits 26 and 28 to the "8" and "4" feedback inputs of comparator 32, augmenting the feedback input to the comparator by 12. The output from AND circuit 16 coupled to the inhibiting input of AND circuit 30 prevents the "4" output of the command converter 12 from being coupled to the "4" command input of comparator 32, thereby diminishing such command input by 4. For example, assume that the command representation is 15 and the feedback representation is 0. Since the command and feedback representations are within the sectors bounding the zero point, AND circuit 16 provides a through-zero output causing the feedback input to comparator 32 to be F+12=0+12=12 and causing the command input to the comparator to be C−4=15−4=11. Hence the comparator output is now C−F=10−11=−1. The corresponding voltage output from converter 33 drives servomotor 35, changing the feedback representation from 0 to 15.

It will be noted that we may eliminate OR circuit 29 so that the "8" output of converter 12 is coupled directly to the corresponding command input of comparator 32. Then gate 31 may be eliminated so that the "8" output of comparator 32 is coupled directly to the corresponding input of converter 33. In such event the command input to comparator 32 in FIGURE 2a would be C+4; and the input to converter 33 would be the same as the output of comparator 32. For example, if the feedback representation is 15 and the command representation is 0, then the feedback input to comparator 32 would be F−12=15−12=3; and the command input would be C+4=0+4=4. Comparator 32 would then directly provide the proper output C−F=4−3=1.

As in FIGURE 1, the shorter path may not always be provided where the feedback and command indications differ by more than the smallest of the three sectors. For example, if in FIGURE 2a the feedback representation is 11 and the command representation is 0 then no through-zero output will be produced from circuit 15. Accordingly the path length will be C−F=0−11=−11. Further, if in FIGURE 2b the feedback representation is 4 and the command representation is 15 then circuit 15 will provide no through-zero output; and the actual path will be C−F=15−4=11.

Moreover, in both FIGURES 1 and 2 if the feedback representation is 15 and the command representation is 4, or if the feedback representation is 0 and the command representation is 11 then no through-zero output will be produced from circuit 15 and the actual path through which the feedback transducer 10 is driven will be eleven counts. It will be appreciated, however, that the shorter path will always be provided so long as it does not exceed four digital increments.

Referring now to FIGURE 3, feedback and command transducers 10 and 12 provide binary-coded decimal outputs extending from a count of 0 to a maximum count of 359. Thus one full revolution represents a count of 359 plus unity or 360. Hence the outputs of converters 10 and 12 are conveniently expressed directly in degrees. The "200" and "100" outputs of feedback converter 10 are coupled to a first and second input of AND circuit 14 and to a first and second inhibiting input of AND circuit 16. The "200" output of command converter 12 is coupled to a third input of AND circuit 16, to an inhibiting input of AND circuit 14, and to an input of AND circuit 38. The "100" output of command converter 12 is coupled to a further inhibiting input of AND circuit 14. The output of AND circuit 14 is coupled to a first input of OR circuit 36 and to a "400" command input of comparator 32. The output of AND circuit 16 is coupled to an inhibiting input of AND circuit 38, to a second input of OR circuit 36 and to one of each of the "100" and "20" inputs of a digital adder 50. The output of OR circuit 36 is coupled to one of the "40" inputs of adder 50. The "20," "40," "80," "100," and "200" outputs of feedback converter 10 are coupled to corresponding inputs of adder 50, the outputs of which are coupled to corresponding feedback inputs of comparator 32. The "1," "2," "4," "8," and "10" outputs of converter 10 are coupled to corresponding feedback inputs of comparator 32. The output of AND circuit 38 is coupled to the "200" command input of comparator 32. The "1," "2," "4," "8," "10," "20," "40," "80," and "100" outputs of converter 12 are coupled to corresponding command inputs of comparator 32. As in FIGURES 1 and 2 the C−F digital output of comparator 32 is coupled to a digital-to-analog converter 33 the output of which drives a servomotor 35 coupled to the input shaft of feedback converter 10.

In operation of the circuit of FIGURE 3 and referring now to FIGURE 3a, if the command representation is between 0° and 99° and the feedback representation is between 300° and 359° then the command indication is augmented by 400 while the feedback indication is augmented by 40. The AND circuit 14 provides an output when the command and feedback transducers 12 and 10 are within the sectors indicated in FIGURE 3a. When the output of command converter 12 is between 0° and 99° the no "200" or "100" outputs are produced; and the absence thereof partially enables AND circuit 14. When the output of feedback transducer 10 is between 300° and 359° then both "200" and "100" outputs are provided, causing AND circuit 14 to generate an output. This output is directly coupled to the "400" command input of comparator 32. The output of AND circuit 14 is further coupled through OR circuit 36 to the "40" input of adder 50 augmenting the feedback representation by 40. For example, assume that the command representation is 0 and the feedback representation is 359. As previously indicated, AND circuit 14 provides a through-zero output. The command input to comparator 32 is C+400=0+400=400; and the feedback input to comparator 32 is F+40=359+40=399. Accordingly, comparator 32 provides an output C−F=400−399=1. This output signal from comparator 32 through converter 33 and servomotor 35 causes the feedback representation to change from 359 to 0.

In FIGURE 3a it will be noted that a numerical representation of one revolution or 360° is provided by augmenting both the feedback and command representations. It is to be further noted that the command representation is augmented by more than a full revolution. However, the algebraic difference 400−40=360 represents one revolution.

In operation of the circuit of FIGURE 3 and referring now to FIGURE 3b, if the feedback representation lies between 0° and 99° and the command representation lies between 200° and 359°, then the feedback representation is augmented by 160° and the command representation is diminished by 200°. The AND circuit 16 provides an output when the command and feedback representations lie within the sectors indicated in FIGURE 3b. When the command representation exceeds 200° then a "200" output is provided from converter 12, partially enabling AND circuit 16. When the feedback representation is less than 100°, then no "200" or "100" output is provided by converter 10. This causes AND circuit 16 to provide an output which, through AND circuit 38 prevents the coupling of the "200" output of converter 12 to the corresponding command input of comparator 32. The output of AND circuit 16 is directly applied to the "100" and "20" inputs of adder 50 and is also ap plied to the "40" input of adder 50 through OR circuit 36. The coupling of these auxiilary inputs to adder 50 augments the feedback input coupled to comparator 32 by 160. Assume that the command representation is 359 and the feedback representation is 0. Since these indications are within the sectors bounding 0°, AND circuit 16 provides a through-zero output causing the actual feedback input to comparator 32 to be $F+160=0+160=160$ and causing the actual command input to comparator 32 to be $C-200=359-200=159$. Comparator 32 thus provides an output $C-F=159-160=-1$. This output from comparator 32, through converter 33 and servomotor 35, changes the feedback representation from 359 to 0.

In all embodiments of the invention except FIGURE 3 the augmentation or diminution of the command and feedback representations impressed on comparator 32 are performed by mere logical operations without the necessity of employing adding or subtracting circuits. This is accomplished by so determining the sectors and the quantities which augment or diminish the command and feedback converter representations within such sectors that for augmentation a converter provides no bit corresponding to a bit of augmentation within a sector and for diminution a converter provides a bit corresponding to a bit of diminution throughout a sector. For example, in FIGURE 2a the feedback sector could noe extend from 180° to 360° if it is desired to diminish the feedback representation by 12 since between 180° and 270° no "4" output bit is provided by the feedback transducer. Also in FIGURE 2a the command sector could not extend from 0° to 180° if it is desired to augment the command indication by either 4 or 12 since between 90° and 180° the command transducer provides a "4" output bit. Similarly, in FIGURE 2b the command sector could not extend from 180° to 360° if it is desired to diminish the command representation by 4 since between 180° and 270° no "4" output bit is provided by the command converter which can be inhibited. Also in FIGURE 2b the feedback sector could not extend from 0° to 180° if it is desired to augment the feedback indication by 12 since between 90° and 180° a "4" output bit is provided by the feedback converter. In FIGURE 3 no single bit represents one revolution or 360°. Accordingly the simple logical operations of augmentation and inhibition to accomplish addition and subtraction are not possible. At least one adding circuit which performs the carry function must be provided since a plurality of bits of the same significance are present. In the circuit of FIGURE 3, however, we have so chosen the manner of modification of the comparator inputs that only the single adding circuit 50 need be provided; and no subtraction circuit is needed. Furthermore, circuit 50 always operates as an adder and need not selectively perform addition and subtraction.

If in FIGURE 3a the difference between the feedback and command representations exceed 60 then it is possible that the longer path may be traversed. For example, assume that the feedback representation is 299 and the command representation is 0. No through-zero output is provided by circuit 15. Accordingly comparator 32 provides the output $C-F=0-299=-299$. The arrangement of sectors in FIGURE 3b approaches the optimum of 120° each; and it is only if feedback and command differ by more than 100° that a possibility of traversing the longer path exists. For example, if the feedback indication representation is 99 and the command representation is 300 then a through-zero output is provided by AND circuit 16. The actual command input is then $$C-200=200-200=0$$

and the actual feedback input is $99+160=259$. Comparator 32 provides the output $C-F=0-259=-259$. Also if the command representation is 359 and the feedback representation is 100 then no through-zero output will be provided from circuit 15. Accordingly, the normal comparator output $C-F=359-100=259$ will be provided. will be appreciated that in each of FIGURES 1 through 3 rather than merely employing a few of the more significant digits to determine the sectors, we may employ as many digits as are required to create three equal sectors so that the shorter path will always be taken provided the feedback and command representations do not differ by more than one-third of a revolution.

It will be seen that we have accomplished the objects of our invention. Our through-zero comparator provides the proper polarity indicative of the shorter path provided the difference between the feedback command representations does not exceed the smallest of the three sectors. Our through-zero comparator indicates the numerical magnitude of the error even though repositioning may require a path through 0°.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A through-zero comparator including in combination a rotatable shaft, means for providing a first digital representation of the actual position of the shaft, means for providing a second digital representation of a desired position of the shaft, each of the digital representations ranging from a maximum count to a minimum count where said maximum and minimum counts are adjacent representations, said range of counts comprising three contiguous sectors, the first sector including the minimum count, the second sector including the maximum count, the third sector including at least one count, means responsive to said representations for providing a difference signal, means responsive to said first representation for producing a second signal indicating that said first representation is within one of said first and second sectors, means responsive to said second representation for producing a third signal indicating that said second representation is within the other of said first and second sectors, and means responsive to the concomitant presence of said second and third signals for changing the difference signal by an amount corresponding to one count greater than the difference between the maximum and minimum counts.

2. A through-zero comparator as in claim 1 in which the smallest of the three sectors subtends an appreciable number of counts.

3. A through-zero comparator as in claim 1 in which each of the three sectors subtends a number of counts approximately equal to one-third of said amount.

4. A through-zero comparator including in combination a rotatable shaft, means for providing a first digital representation of the actual position of the shaft, means for providing a second digital representation of a desired position of the shaft, each of the digital representations ranging from some minimum count to some maximum count, means responsive to said representations for providing a difference signal, means responsive to the concomitant presence of the maximum count of one representation and the minimum count of the other representation for suddenly changing the difference signal by an amount corresponding to one count more than the difference between said maximum and minimum counts and means responsive to said changed difference signal for rotating said shaft.

5. A through-zero comparator including in combination a rotatable shaft, means for providing a digital representation of the actual position of the shaft, means for providing a digital representation of a desired position of the shaft, means responsive to said representations for providing a coarse difference indication, means responsive to said representations for providing a precise difference signal, means responsive to said coarse difference indication for selectively suddenly changing the precise difference signal by an amount corresponding to a representation of one revolution of the shaft and means responsive to the selectively changed precise difference signal for driving said shaft.

6. A through-zero comparator including in combination a rotatable shaft, means for providing a first digital representation of the actual position of the shaft, means for providing a second digital representation of a desired position of the shaft, each of the first and second digital representations having a most significant bit, means responsive to the representations for providing a difference signal, means responsive to said most significant bits for providing an output when the difference signal exceeds a magnitude corresponding to a representation of one-half revolution of the shaft, means responsive to said output for suddenly changing the difference signal by an amount corresponding to a representation of one revolution of the shaft and means responsive to said changed difference signal for driving said shaft.

7. A through-zero comparator including in combination a rotatable shaft, means for providing a digital representation of the actual position of the shaft, means for providing a digital representation of a desired position of the shaft, means responsive to the representations for providing a difference signal, means for providing an output when the difference signal exceeds a magnitude corresponding to a representation of one-half revolution of the shaft, means responsive to said output for suddenly changing the difference signal by an amount corresponding to a representation of one revolution of the shaft and means responsive to said changed difference signal for driving said shaft.

8. A through-zero comparator including in combination a rotatable shaft, means for providing a first digital representation of the actual position of the shaft, means for providing a second digital representation of a desired position of the shaft, a comparator, first means coupling the first digital representation to the comparator, second means coupling the second digital representation to the comparator, third coupling means responsive to the comparator providing an output, and means including one of the three coupling means for selectively suddenly changing said output by an amount corresponding to a representation of one revolution of the shaft and means responsive to said changed difference signal for driving said shaft.

9. A through-zero comparator as in claim 8 in which the selective means includes two of the three coupling means.

10. A through-zero comparator as in claim 8 in which the selective means includes the three coupling means.

11. A through-zero comparator including in combination a rotatable shaft, means for providing a digital representation of the actual position of the shaft, means for providing a digital representation of a desired position of the shaft, means responsive to said representations for providing a difference signal means for selectively suddenly changing the difference signal by an amount corresponding to a representation of one revolution of the shaft and means responsive to said changed difference signal for driving said shaft.

References Cited
UNITED STATES PATENTS

| | | | |
|---|---|---|---|
| 3,182,240 | 5/1965 | Schmid | 340—146.2 X |
| 3,242,477 | 3/1966 | Frothingham | 340—146.2 X |

MALCOLM A. MORRISON, *Primary Examiner.*

M. J. SPIVAK, *Assistant Examiner.*